April 23, 1957 W. MÜLLER ET AL 2,790,028

TELEPHONE ANSWERING UNIT AND SYSTEM

Filed Aug. 17, 1951 6 Sheets-Sheet 1

INVENTORS
Willy Mueller
Robert Dreyer
BY Curtis, Morris & Safford
ATTORNEYS

TELEPHONE ANSWERING UNIT AND SYSTEM

Filed Aug. 17, 1951 6 Sheets-Sheet 2

INVENTORS
Willy Mueller
Robert Dreyer
BY
Curtis, Morris & Safford
ATTORNEYS

TELEPHONE ANSWERING UNIT AND SYSTEM

Filed Aug. 17, 1951 6 Sheets-Sheet 3

INVENTORS
Willy Mueller
Robert Dreyer
BY Curtis, Morris & Safford
ATTORNEYS

TELEPHONE ANSWERING UNIT AND SYSTEM

Filed Aug. 17, 1951 6 Sheets-Sheet 4

INVENTOR
Willy Mueller
Robert Dreyer
BY
Curtis, Morris & Safford
ATTORNEY

April 23, 1957 W. MÜLLER ET AL 2,790,028

TELEPHONE ANSWERING UNIT AND SYSTEM

Filed Aug. 17, 1951 6 Sheets-Sheet 5

INVENTORS
Willy Mueller
Robert Dreyer
BY Curtis, Morris & Safford
ATTORNEYS

TELEPHONE ANSWERING UNIT AND SYSTEM

INVENTORS
Willy Mueller
Robert Dreyer
BY
Curtis, Morris & Safford
ATTORNEYS

United States Patent Office 2,790,028
Patented Apr. 23, 1957

2,790,028

TELEPHONE ANSWERING UNIT AND SYSTEM

Willy Müller, Zurich, and Robert Dreyer, Kusnacht-Zurich, Switzerland; said Dreyer assignor to said Müller

Application August 17, 1951, Serial No. 242,342

13 Claims. (Cl. 179—6)

This invention relates to telephone answering systems, and particularly to a device or instrument adapted to be connected or coupled to a telephone circuit for automatically transcribing or delivering a predetermined message to the telephone circuit when the telephone rings in response to a party making a call. The apparatus is adapted for use in doctors' offices or other professional offices or the like, or in residences, in circumstances where the telephone subscriber or attendant is out of his office or otherwise away from the telephone a good deal and desires that a short, predetermined message be delivered to any party calling the office.

The illustrative embodiment of the invention is in the form of a simple and compact, unitary instrument, and it is one of the objects to provide a device of this type having these particular characteristics so that its connection for or adaptation to uses such as those mentioned above will be extremely simple and convenient.

Another object of the invention is to provide a device or instrument as described in the foregoing having very simple and convenient arrangements and manual controls whereby a message may be very conveniently recorded, played back for vertification and then may be transcribed automatically to the telephone circuit in response to ringing of the phone.

Another object of the invention is to provide an instrument as described which offers the maximum in simplicity and convenience of use in that the device is unitary and is provided with extremely simple control and operating arrangements. A further object is to provide for the above with apparatus which is inexpensive to manufacture and maintain, efficient and dependable in use, easily installed, adaptable to various conditions encountered in practice, and susceptible of mass production.

The invention accordingly consists in the features of construction, combinations of elements, arrangements of parts and in the several steps and relation and order of each of the same to one or more of the others, all as will be illustratively described herein, and the scope of the application of which will be indicated in the following claims.

Figure 2:
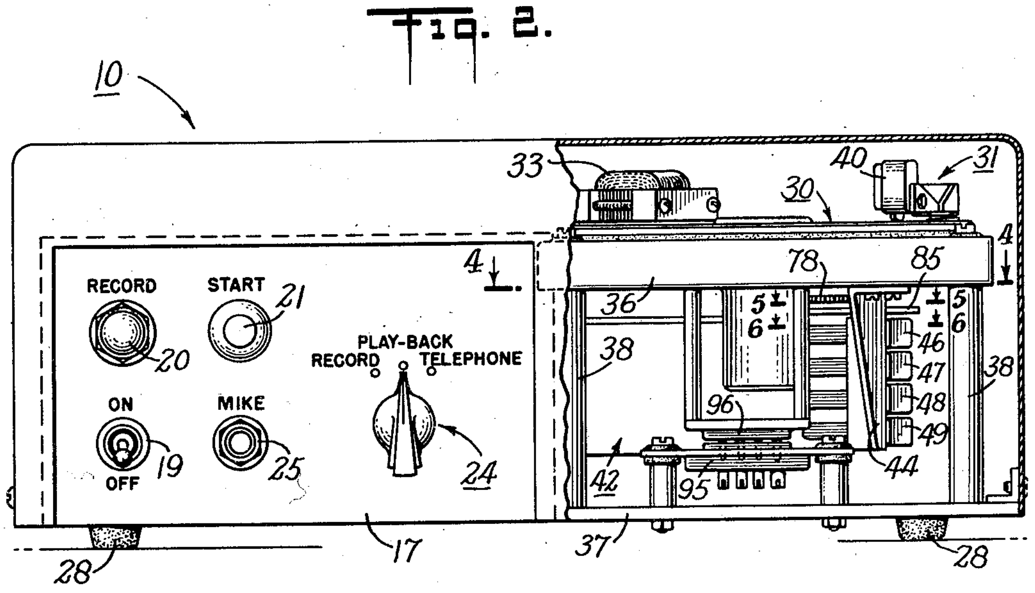
Figure 2 is a front elevation of the announcement unit or instrument of Figure 1 with a portion of the cover broken away.
Figure 4:
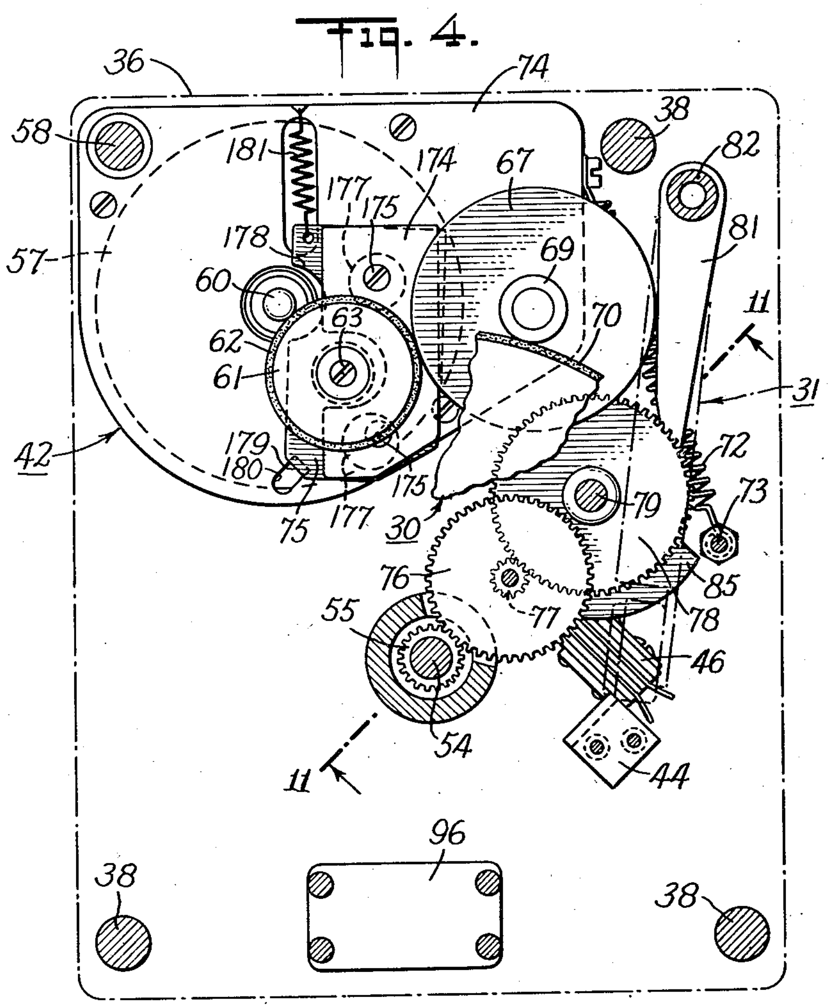
Figure 4 is a horizontal section on the line 4—4 of Figure 2.
Figure 5:
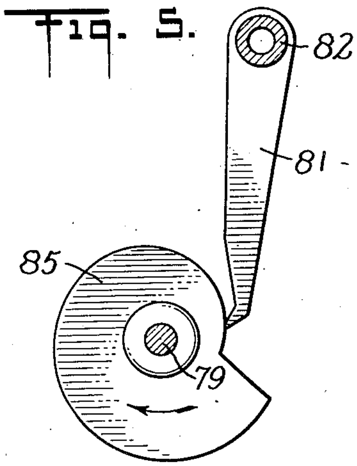
Figure 6:
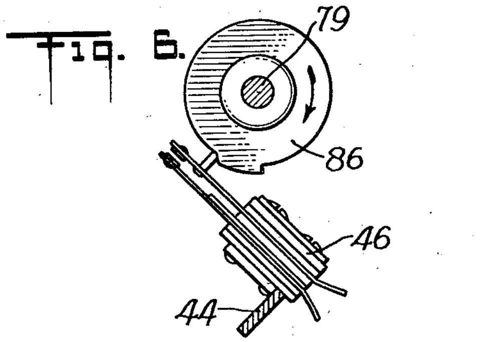
Figure 7:
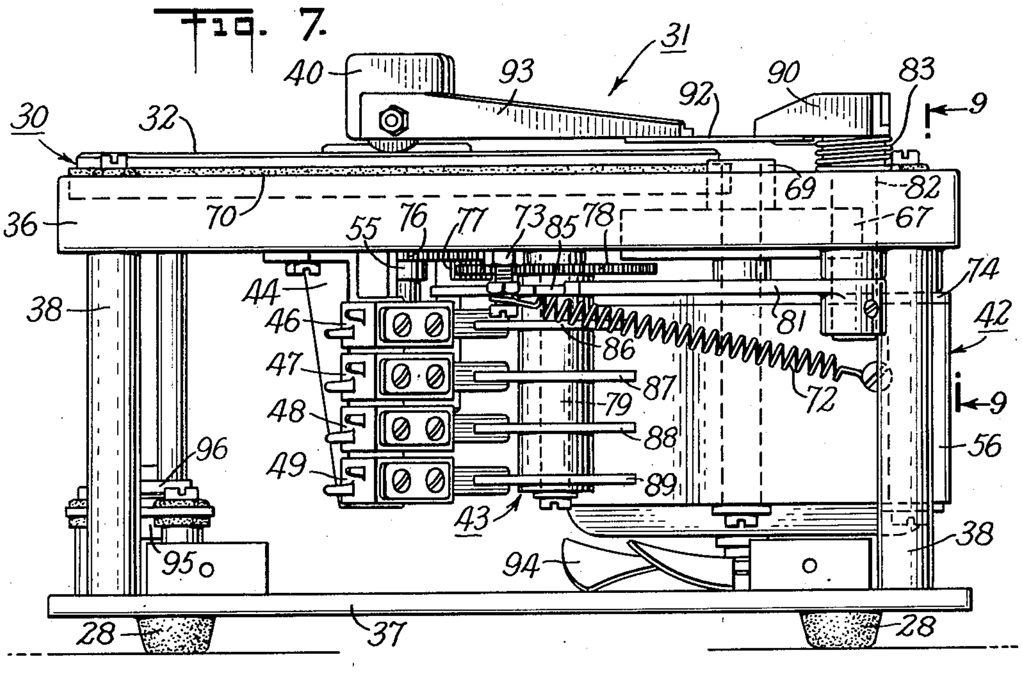
Figures 8, 9, 10:
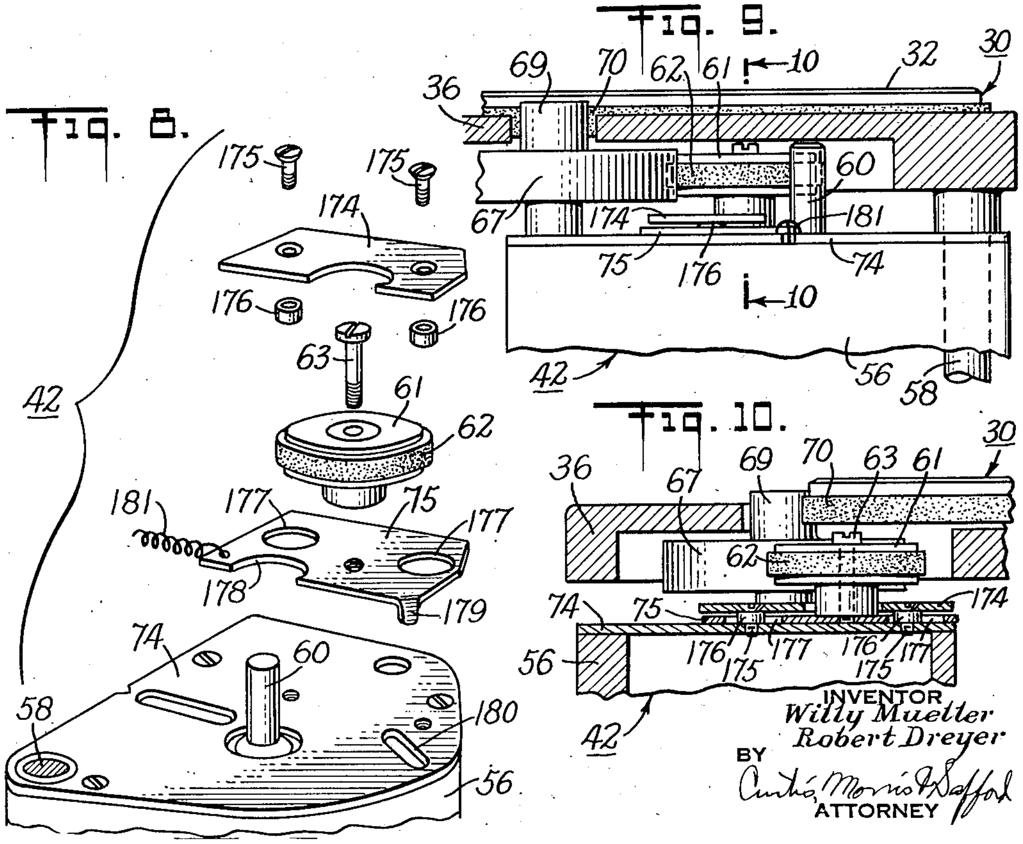
Figure 11:
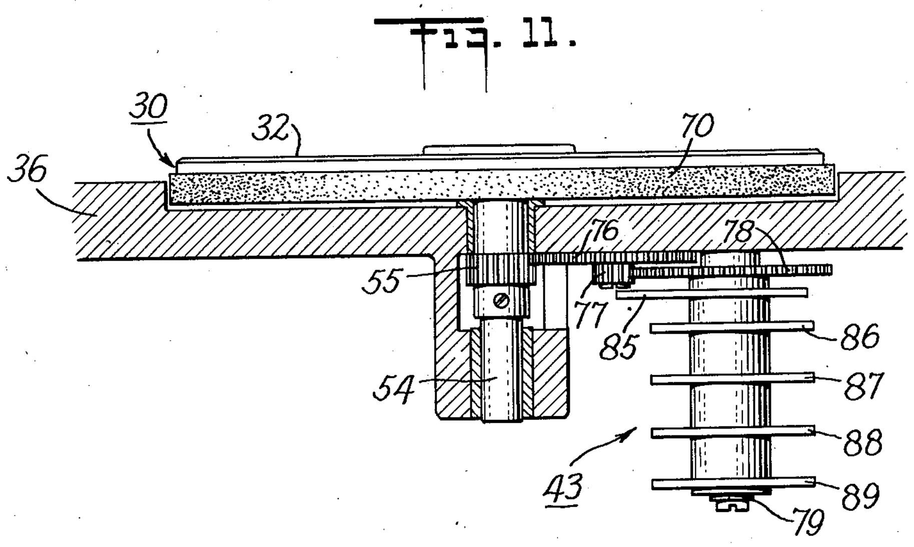
Figure 12:
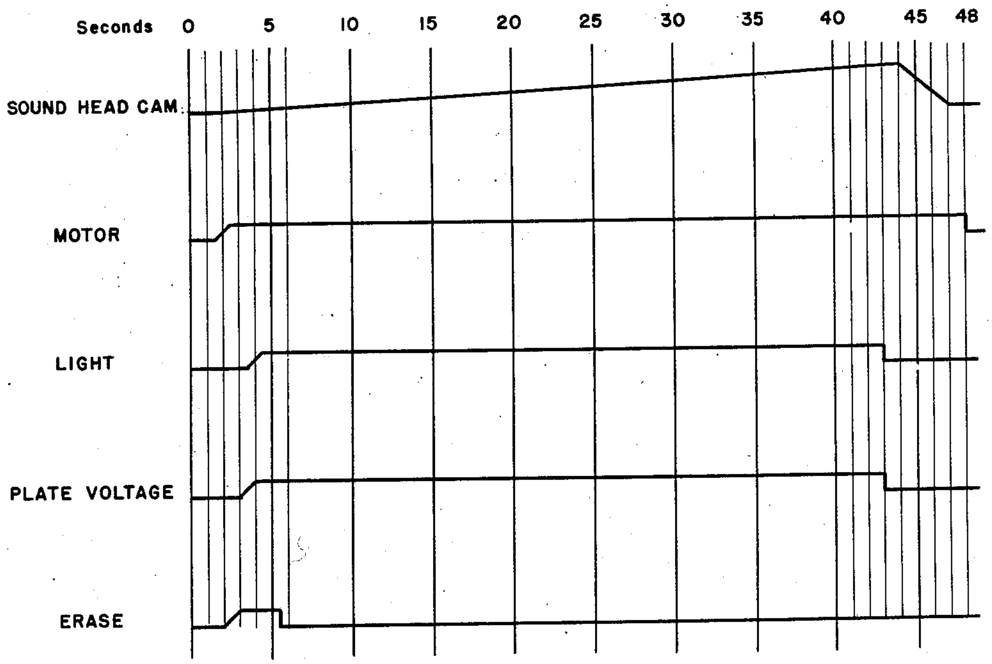
Figure 13:
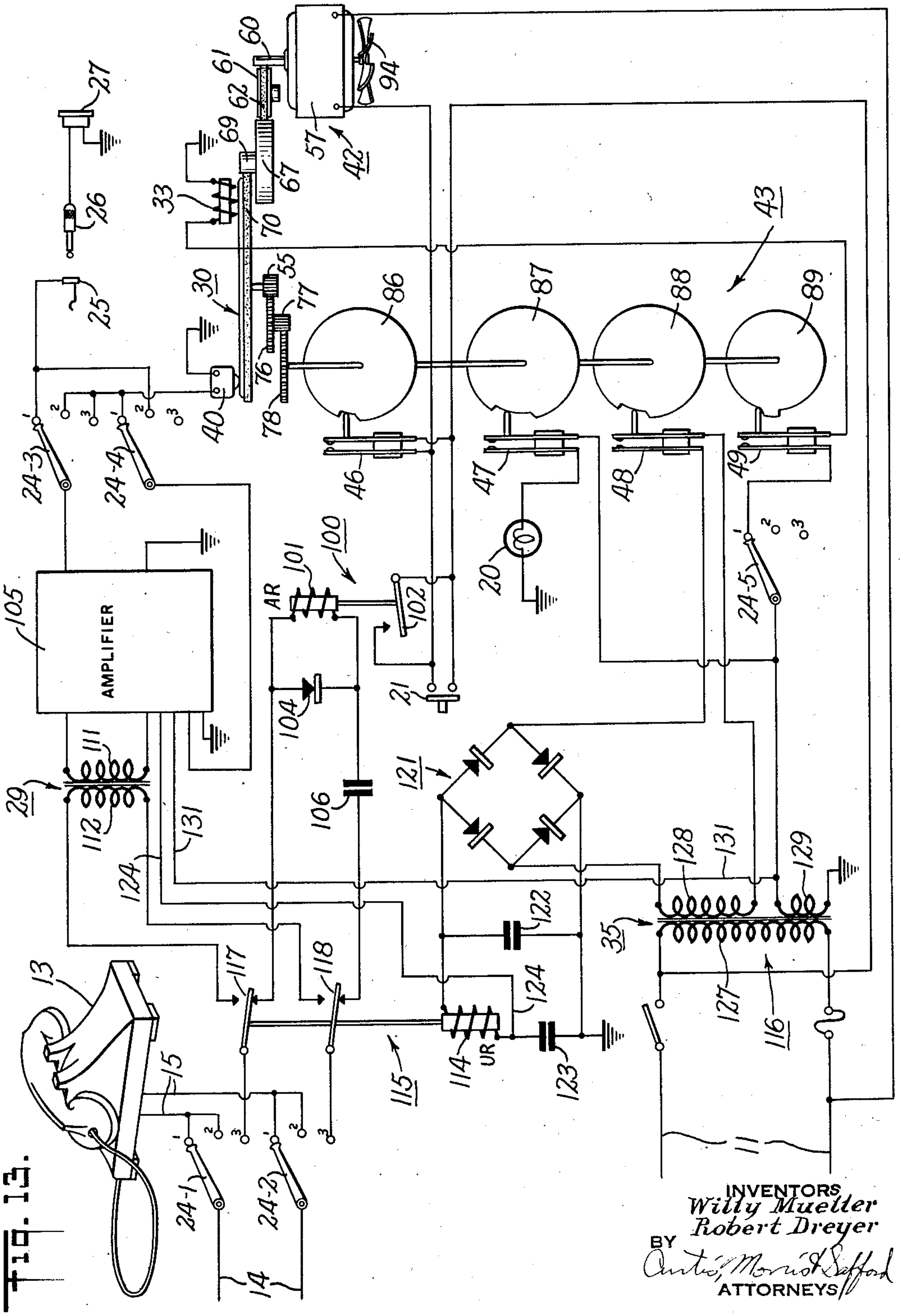

Figures 5 and 6 are fragmental horizontal sections on the lines 5—5 and 6—6 of Figure 2;

Figure 7 is an enlarged end elevation of the unit with the cover removed;

Figure 8 is an exploded view of a portion of the recording disc driving unit;

Figure 9 is a vertical section on the line 9—9 of Figure 7;

Figure 10 is a vertical section on the line 10—10 of Figure 9;

Figure 11 is a fragmentary vertical section on the line 11—11 of Figure 4;

Figure 12 is a diagram showing the contours of the operating cams of the cyclic timing mechanism and illustrating schematically the operation of the unit; and Figure 13 is a schematic wiring diagram of the entire system showing on a reduced scale certain of the essential parts of the unit.

Figure 1:
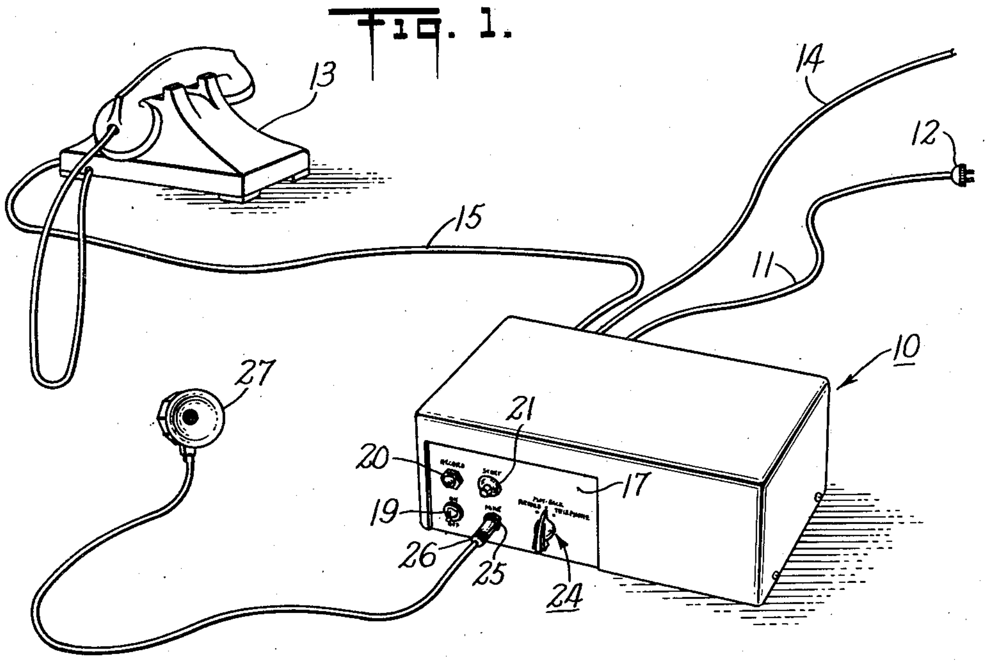
Figure 1 is a general view of a system including the announcement unit or instrument constituting an illustrative embodiment of this invention showing its connections to the telephone and the microphone-receiver.

Referring to Figure 1 of the drawings, the announcement unit or instrument is shown generally at 10 with the electrical power supply connecting wires 11 terminating at a plug 12. The telephone lines 14 are connected to unit 10, and a telephone set or instrument 13 is connected to the unit 10 by wires 15. Unit 10 has a control panel 17 and (see Figure 2) on this panel are: an "On" and "Off" control switch 19; an indicator light 20 which is turned on or lighted automatically when unit 10 is performing a recording or a reproducing or announcement cycle; a push button switch 21 for manually starting a cycle of the operations; a three-position operation control switch 24; and, a female plug or socket 25 for plugging in a male plug or jack 26 which thereby connects the instrument to a microphone-receiver 27. The three position control switch 24 has the following positions: "Record" or "1"; "Play Back" or "2"; and "Telephone" or "3"; and, the functioning of the unit with this switch in these positions will be described more in detail presently.

Figure 3:
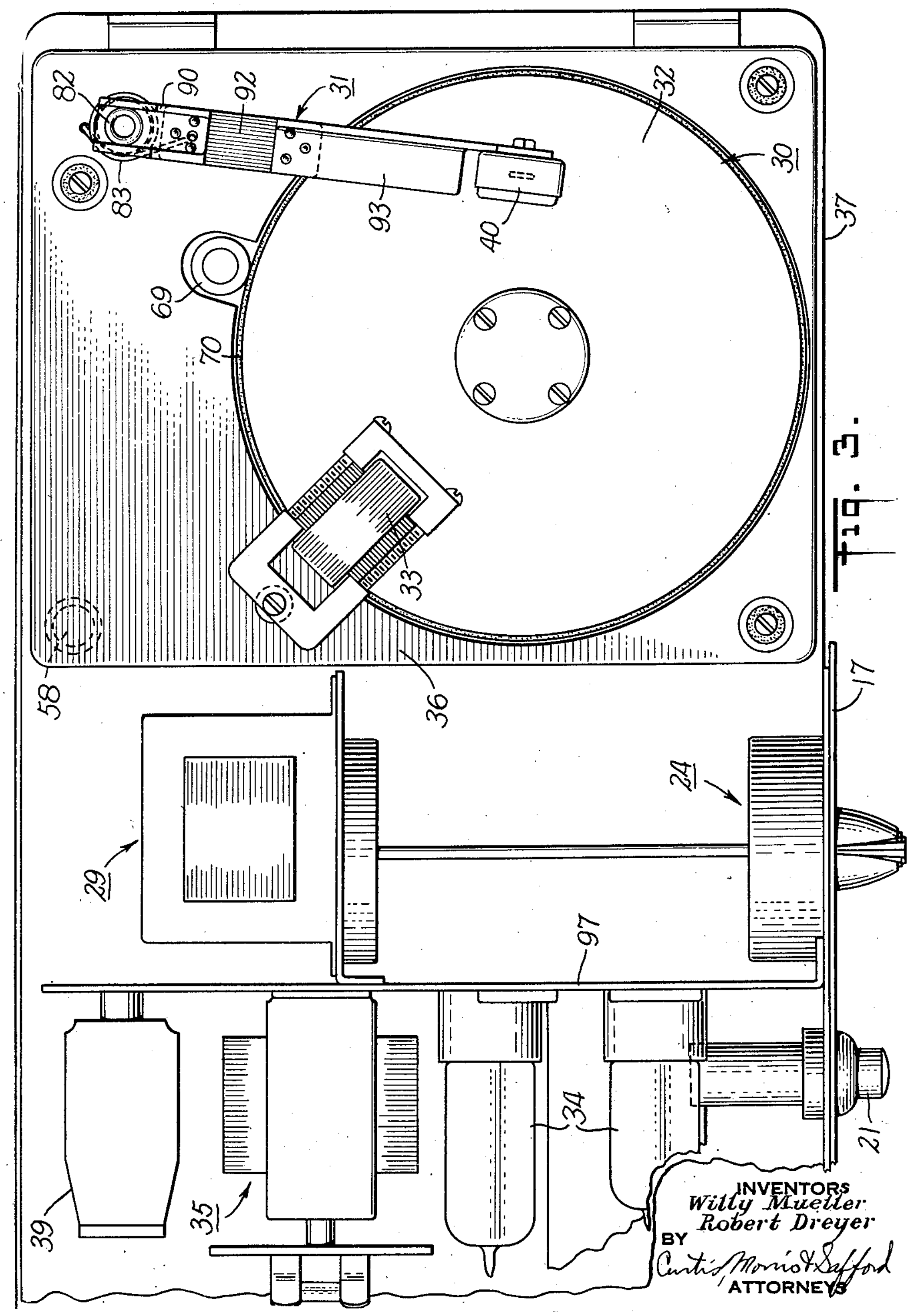
Figure 3 is a top plan view of the unit with the cover removed and with the left-hand portion broken away.

Referring now to Figure 3 of the drawings, which is a plan view of the instrument with the cover removed, numeral 30 designates the rotatable turntable which carries on its top surface the magnetic sound arm 31; and, numeral 33 designates a magnetic erasing device which demagnetizes the disc, thereby to remove all previous recordings. At the left-hand portion of Figure 3 there are shown in general outline the main electrical components of the system including, an audio transformer 29, a power supply transformer 35, amplifier tubes 34 and two relays 39. These components will be described more in detail presently.

The mechanical components of the mechanism are mainly mounted upon an upper platform 36 which is removably mounted on a base or lower platform 37 (see also Figures 4 and 7). Three corner posts 38 support the upper platform 36 from the lower platform 37, and the unit is supported by four corner feet 28 fixed to the bottom of platform 37. The upper platform 36 is rigidly clamped to posts 38 by screws which may be removed so that the upper platform and the parts mounted on it may be lifted off. The magnetic sound arm 31 is shown (Figure 3) overlying the turntable 30 and having a magnetic shoe or head 40 as shown which engages the magnetic recording disk 32. A motor drive assembly or unit 42 (Figure 7) is swingably mounted on platform 36, its purpose being to drive the magnetic recording disk and also a cam assembly 43 which operates a bank of control switches and also controls the movement of the sound arm across the recording disk. A bracket 44 carries a bank of control switches 46, 47, 48 and 49, each of these switches comprising two or more blades carrying electrical contacts; and, one blade of each switch has a cam follower cooperating respectively with cams 86, 87, 88 and 89 of the cam assembly 43 which thereby operate the switches.

In Figure 4 the magnetic disk turntable 30 is shown in broken lines, and it has a central shaft 54 journaled in a bearing in platform 36 and carrying a spur gear 55 at its lower end (see also Figure 11). The gear 55 is the driving gear of the gear train which drives the cam assembly of the cam operated switches as will be described. A solid cast iron motor block 56 (Figures 4, 7 and 9) is provided for the electric motor 57 of the motor drive assembly 42 for driving the turntable 30 and the cam assembly 43. This motor drive is pivotally supported on a pivot bolt 58 extending through a pivot opening in the block and rigidly mounted at its upper end in the upper platform 36. The drive motor 57 has a shaft 60 (Figure 4) the upper end of which frictionally engages with a rubber band or tire 62 of a movable disk rotor or idler drive roller 61 having a bolt-like shaft 63. Roller 61 also through its tire frictionally engages the periphery of a larger roller 67 which has a smaller central driving portion or roller 69 which frictionally engages the periphery of the turntable 30. Turntable 30 has a peripheral rubber friction band or tire 70 which is engaged by roller 69 thereby to drive the turntable.

As indicated above the motor block 56 is pivotally mounted and it is normally biased or urged in a clockwise direction (Figure 4) by a coil spring 72, one end of which is connected to the motor block and the other end of which is attached to a screw 73 in the upper platform 36. The effect of this spring is to normally urge the smaller rotor 69 into frictional engagement with the disk or turntable 30 thus to drive it. Motor 57 is tightly fitted in motor block 56 with its stator clamped at the top by a removable plate 74.

Plate 74 has mounted on it a slidable plate 75 (see Figures 8 and 10) which provides a movable mounting for shaft 63 of the idler drive roller 61. Plate 75 rests upon the top surface of plate 74 and is held in place by a fixed plate 174 which is clamped to plate 74 by a pair of screws 175. A pair of spacer sleeves or collars 176 on screws 175 hold plate 174 away from plate 74 so that the slidable plate 75 may move. Plate 75 has two openings 177 and a notch 178 so that plate 75 may slide without interference by collars 176 or the motor shaft 60. An integral finger 179 projects into a slot 180 in plate 74, thus to limit somewhat the sliding movement of plate 75. A tension spring 181 is attached at one end to plate 75 (see Figure 4) and is anchored at its other end to plate 74 so that plate 75 is spring biased (toward the top of Figure 4), and this urges roller 61 against the motor shaft 60 and also against roller 67. Thus roller 61 has a certain freedom of sliding movement in the plane of plate 75 but its axis of rotation is held parallel to that of the motor. The rate of rotation of the turntable is determined by the rate of rotation of the motor shaft 60 and the speed reduction effected by the series of drive rollers 61, 67, and 69 to the turntable periphery.

It is thus seen that the motor drive unit 42 is a swinging or rocking unitary structure which is urged toward its driving relationship with the recording disc by spring 72 which exerts a constant resilient pressure urging the relatively heavy motor drive unit clockwise (Figure 4); and, this tends to hold roller 69 into driving engagement with the turntable. While the force of this spring is not great and does not unduly compress the turntable tire 70, the stabilizing effect of the weight of the motor drive unit combines with the effect of the spring to insure a satisfactory drive at all times. Thus, the spring initially swings the motor drive unit about its pivot 58 so that roller 69 drivingly engages the tire 70, and then the drive unit tends to remain in this driving relationship. The roller 69 is small and has a relatively smooth driving surface while the turntable is much larger and carries the friction surface tire; this insures longer life for the tire because the wearing surface is large.

Referring now to Figure 11, the turntable 30 is mounted in a recess in the upper platform 36 and is supported at its center. It has been pointed out above that the turntable central shaft 34 carries a spur gear 55 which drives the cam assembly 42. Accordingly, this gear meshes with a larger gear 76 (see also Figure 4) which is mounted on a pivot spindle journaled in the upper platform 36. On gear 76 is another spur gear 77 which is fixed to gear 76 and meshes with a larger gear 78 mounted on and fixed to a cam shaft or spindle 79 journaled in the upper platform 36. Shaft 79 is the mounting shaft for the cam assembly 43 which includes four cam disks 86, 87, 88 and 89 referred to above (Figure 7) which operate the switches 46, 47, 48 and 49.

The cam assembly 43 also includes an additional cam 85 on shaft 79 which is engaged by a cam follower 81 (see Figure 5) fixed to a pivot shaft 82 (see Figure 7) which is journaled in the upper platform 36 and provides the pivot mounting for the magnetic sound arm 31. The sound arm 31 has a mounting bracket portion 90 fixed to the upper end of shaft 82, and the main arm portion 93 is attached to portion 90 by a resilient leaf spring 92 which urges the shoe or sound head 40 into engagement with the top surface of the magnetic recording disc 32. A coil spring 83 surrounds shaft 82 directly beneath arm 31, and the spring has its lower end attached to platform 36 and its upper end attached to arm 31 and it is tensioned so that it urges the arm clockwise (Figure 3) and thus urges the cam follower 81 (Figure 5) against cam 85.

Cam 85 has the true spiral contour shown and as it starts to rotate clockwise from the home position of Figure 5, it swings the cam follower 81 with a slow steady movement counterclockwise about its pivot at shaft 82. This movement of the cam follower is transmitted through shaft 82 to the sound arm 31 (see Figure 3) so that the sound head 40 is moved radially outwardly from its home position at the inner periphery of the recording zone of disc 32, and thus across the recording zone. A complete rotation of disc 85 causes the sound head to move slowly and steadily across the recording zone, and then the sound head is returned rapidly to its home position (see Figure 5) with the cam follower traversing the somewhat radial segment of the cam surface.

Mounted upon the lower end of the motor shaft 60 (see Figure 7) is a fan 94 which acts when the motor is operating to blow air upwardly through a group of small openings in the lower platform and thence past the motor and over the other parts of the apparatus thereby to keep the unit cool. As indicated above, the upper platform 36 is removably supported and when the screws holding it in place are removed, this platform may be lifted together with all the component parts mounted upon it. Electrical connections are provided with the motor and with the control switch assembly through a multiple jack plug assembly which is formed by a female plug 95 (see Figure 2) rigidly mounted on the lower platform 37, and a male plug 96 rigidly mounted on the upper platform 36. Certain of the electrical components are separated from the motor and its associated mechanical parts by the vertical panel 97 upon which the electrical components are mounted. The magnetic recording disc 32 is capable of re-use over a long period of time without attention and the mechanical structures are designed and built to withstand considerable abuse so as to give good service under extreme conditions of operation.

As indicated above, the switch-operating cams 86, 87, 88 and 89 are also rotated through a complete rotation during each cycle of operations. For example, referring to Figure 6, cam 86 is shown together with its switch 46, and the cam rotates clockwise from the home position shown. Thus, the switch is open initially, but after a short arcuate movement the switch is closed for a predetermined period of time while the rise on the cam engages and moves past the cam follower. The other cams 87, 88 and 89 have contours to be explained more fully below, which close their respective switches for predetermined periods of each cycle of operations.

Reference will now be had to Figure 13 which is a diagrammatic showing of the system including the electrical controls and the various electrical and mechanical interlocks whereby the desired operation and sequences are obtained. This figure shows various of the previously described parts of the apparatus, such as the cam discs and the switches operated thereby, the sound head, the magnetic recording disc, the microphone-receiver, etc. The previously described switch 24, having the three positions "Record" or "1," "Play Back" or "2," and "Telephone" or "3," is a gang switch having five blades designated 24–1 to 24–5, respectively, each of which is engageable with three separate contacts. As shown at the left-hand portion of the figure, two blades 24–1 and 24–2 connect the telephone lines 14 to the telephone set when the blades are in either of positions 1 or 2; and these blades act in position 3 to connect the telephone lines to the announcement mechanism whereby an announcement is automatically made from the instrument directly to the telephone lines. Numeral 100 designates a relay, which is also identified by the letters "AR," and has a winding 101 and a contact or switch 102, and this relay is actuated by the telephone ringing current, for placing the announcement mechanism into operation. The circuit of winding 101 includes a filter network comprising a series condenser 106 and a half-wave crystal rectifier 104 in parallel with the winding.

The amplifier associated with the recording and reproducing mechanism is designated 105 and has its output connected to the primary winding 111 of the announcement audio transformer 29, the secondary winding 112 of which is arranged to be connected to the telephone lines. The amplifier input circuit has one side grounded and the other side connected to a switch blade 24–3; and similarly, the amplifier output circuit has one side grounded and its other side connected to a switch blade 24–4. The microphone-amplifier 27 has one side grounded and the other side connected to the "1" position contact of blade 24–3 and also to the "2" position contact of blade 24–4; and, the sound head 40 has one side grounded and the other side connected to the "2" and "3" position contacts of blade 24–3 and to the "1" position contact of blade 24–4. Thus, when switch 24 is in the "Record" or "1" position, the microphone-receiver is connected to the amplifier input and the sound head is connected to the amplifier output so that the operator may record a message onto the recording disc. Then, when switch 24 is in the "Play Back" or "2" position the microphone-receiver is connected to the amplifier output and the sound head is connected to the amplifier input so that recorded messages are reproduced to the microphone-receiver. When switch 24 is in the "Telephone" or "3" position the microphone-receiver is disconnected and the sound head is connected to the amplifier input circuit, and the output circuit is connected through the transformer 29 to switches 117 and 118 so that the recorded message may be transmitted over the telephone lines. These switches 117 and 118 are of a relay 115 which is also referred to as the "UR" relay and which has a winding or solenoid 114. These two switches are of the single-pole double-throw type so that when blades 24–1 and 24–2 are in the "Telephone" or "3" position these switches connect the telephone lines either to the circuit of relay 100 or to the secondary winding of the audio transformer 29.

The power supply unit for the system is indicated at 116 and it includes transformer 35 having a primary winding 127 connected to the power supply lines 11, and two secondary windings 128 and 129. Winding 129 supplies A. C. power at 6.3 volts for operation of the control light 20 and the erasing magnet 33. The plate voltage for the amplifier tubes in the amplifier 105 is from the secondary winding 128, and this power is supplied through a full wave rectifier 121 and a filter network formed by two condensers 122 and 123 and the winding 114 of relay 115 which acts as a choke coil. A line 124 extends to the plate circuits of the amplifier tubes. Current to heat these tubes is supplied from winding 129 of transformer 116 through a line 131.

Figure 9 is a diagram illustrating graphically the operation of the switches 46, 47, 48 and 49 by their respective cams, and the movement of the sound head 40 is also indicated. This diagram represents a complete cycle of operation for the instrument which takes forty-eight seconds to complete, and the "0" position at the left represents the initial or "home" position of the cams and the numerals along the diagram indicate seconds elapsed after the start of a cycle. The line for each switch cam has a base portion at the home position which represents the dwell on the cam at which the switch is at rest. Switch 46 is the interlock circuit for the motor and is also referred to as switch N1, and it is actuated approximately one and one-half seconds after the start of the cycle. Initially, for each cycle the motor is started either by the closing of the manual push button switch 21 or the automatic closing of the relay switch 102; but after one and one-half seconds, switch 46 is actuated and it holds the motor energized until the cycle has been completed, thus returning the cam assembly to the home position. Switch 47, which is also referred to as switch N2, controls the indicator light 20 and this switch is closed at the end of three and one-half seconds after the start of the cycle, and it opens again thirty-nine and one-half seconds later, which is forty-three seconds after the start of the cycle. As will be discussed more fully below, this light indicates that the instrument is in operation, and that the sound head is being moved across the recording disc so as to record a message or to play back a recorded message, depending upon the setting of the switch 24.

Switch 48, which is also referred to as switch N3, controls the supplying of voltage to the plate circuits of the amplifier tube and this switch is closed at the end of three seconds after the start of the cycle and it opens forty seconds later. Thus, the amplifier is energized for one-half second prior to the recording and reproducing period represented by the turning on of light 20 by the closing of switch 47. Switch 49, which is also referred to as N4, controls the erasing operation and it is closed for a three and one-half second period starting two seconds after the cycle begins. This circuit is energized only during a cycle when a message is to be recorded, and during such a cycle the recording disc is freed of all messages prior to the recording. As will be explained more fully below, the recording operation may start prior to the completion of the erasing operation because of the relative positioning of the recording head and the erasing unit or device 33.

At the top of Figure 12, the movement of the sound head is represented. As indicated above, the cam 85 which moves the sound head has a true spiral contour and, therefore, the sound head is moved slowly at an even rate from the home position at the left across the recording zone, and this movement is represented by the straight line rise shown. This movement starts immediately upon the start of the cycle and is completed at the end of forty-four seconds. During the next three seconds the sound head is returned to its home position and it reaches this home position just prior to the time that the motor is stopped by the opening of switch 47.

Assume now that the subscriber or proprietor wishes to record a message or announcement to be reproduced to persons calling him in his absence. The first step is to place switch 24 in the "Record" or "1" position, and this positions the blades of switch 24 as shown in Figure 8. Thus, as shown at the left, blades 24–1 and 24–2 connect the telephone lines 14 to the telephone set 13 and, as shown at the right, blade 24–3 connects the microphone-receiver 27 to the input side of the amplifier and blade 24–4 connects the output side of the amplifier to the sound head. The push button switch 21 is then closed manually by the operator and this starts motor 57, thus starting the cycle. As indicated above, one and one-half seconds after the motor is started the interlock switch 46 is closed and the motor is therefore held energized for the complete cycle and the push button switch may be released.

As shown at the bottom of Figure 13, the positioning of switch 24 to the "Record" position also moves blade 24–5 so as to connect the voltage source to the line extending to "Erase" switch 49, and this switch closes at two seconds after the start of the cycle. This energizes the erasing device 33 so that the recording area of the disc is demagnetized or erased as it passes under the erasing device. Referring to Figure 3, the recording disc rotates clockwise and, therefore, the portion of the disc which has been erased moves through an arc of approximately one hundred and twenty degrees before it reaches the sound head and the portion passing from under the sound head moves approximately two hundred and forty degrees before it reaches the erasing device. Therefore, the erased portion of the disc has reached the second head so that the recording operation may start during the time that the final erasing operation is being carried on; provided, of course, that the erasing operation is stopped prior to the time that the portion of the disc bearing a new recording reaches the erasing device. In actual practice leeway is provided to insure that the disc is completely demagnetized before it reaches the sound head and also to insure that no portion of the newly recorded message will be erased. Referring now again to Figure 12, it is seen that the signal light 20 is turned on by the closing of switch 48 approximately two seconds before the end of the erasing operation, and during this time the recording of the message may be started upon the portion of the disc which has been erased; then the portion of the disc having the new message on it does not reach the erasing device until the de-energization thereof.

The message which is recorded may be of any length up to approximately thirty-nine and one-half seconds, whereupon switch 48 is re-opened so as to extinguish light 20 and indicate that the recording period has ended. Simultaneously, the plate voltage switch 48 is opened, thereby de-energizing the amplifier 105. As indicated above, the motor continues to operate to return the sound head and the cam assembly to the home position, and the motor is stopped at the end of forty-eight seconds.

If the subscriber or proprietor wishes to check the recorded message, he turns the switch 24 to the "Play Back" or "2" position in which blades 24–1 and 24–2 maintain the telephone set 13 connected to the telephone lines but blades 24–3 and 24–4 now connect the sound head 40 to the input circuit of the amplifier and connect the microphone-receiver 27 to the output circuit of the amplifier. In addition, the blade 24–5 opens the "Erase" circuit so that the erasing device 33 is not energized during the "Play Back" cycle. The operator then manually closes the push button switch 21 to start the cycle which is substantially the same as the recording cycle discussed above, except as has been indicated, the "Erase" circuit remains de-energized. Accordingly, after one and one-half seconds, the interlock switch for the motor is closed, and shortly thereafter the light switch and the plate voltage switch are closed, indicating to the operator that the cycle has started and energizing the amplifier. The operator then listens to the recorded message by holding the microphone-receiver to his ear. If the message is not satisfactory he may turn switch 24 to the "Record" position and record a new message, but if the message is satisfactory, he turns switch 24 to the "Telephone" or "3" position.

When switch 24 is in the "Telephone" or "3" position, the telephone lines 14 are not connected to the telephone set 13, but are connected through blades 24–1 and 24–2 to the armatures of switches 117 and 118. The blade 24–4 and "Erase" circuits are de-energized, and the blade 24–3 remains connected to the sound head. Thus, a ringing signal from the telephone lines passes to the circuit of relay 100 to energize its winding 101 and thereby close switch 102. This starts motor 57 in the same manner as does the closing of push button switch 21, and when the cam assembly is advanced sufficiently, the interlock switch 46 is closed so that the cycle continues even when switch 102 re-opens. A single ringing signal may advance the cam assembly sufficiently to close switch 46, but if the ringing signal is of short duration the cam assembly is advanced only a small amount; and, the cycle may not start until a second or even subsequent ringing signal.

Light 20 is then turned on to indicate that a telephone-answering cycle is being carried on; for example, if the subscriber should return at that time. The plate voltage switch is also closed, but as indicated above, the "Erase" circuit remains de-energized and the recorded message is transmitted from the sound head through the amplifier 105 and the audio transformer 29 to switches 117 and 118. The solenoid or winding 114 of relay 115 is in the plate voltage circuit so that the closing of the plate voltage switch 47 has previously energized this solenoid and raised the armatures of switches 117 and 118. Thus, the armatures now connect the output circuit of the audio transformer to the telephone lines so that the recorded message is transmitted over the telephone lines to the calling party.

With switch 24 in the "Telephone" or "3" position, the instrument automatically clears the line at the end of the announcement cycle, that is, after forty-eight seconds, and the instrument will then react immediately to another call. When the subscriber returns he merely turns switch 24 to either the "Record" or "Play Back" position, and the telephone instrument 13 will then operate in the exact manner which it would operate if the unit 10 were not installed. As indicated above, a message may be reproduced indefinitely without loss of fidelity, and the life of use of the entire instrument, including the recording disc, is extremely long. Thus, an extremely simple and sturdy construction is provided and the mode of operation is such that the system is efficient and dependable at all times.

Under some circumstances, some of the features of the system may be omitted or modified while still retaining most, if not all, of the advantages inherent in this embodiment of the invention. Furthermore, certain of the mechanical arrangements may be considerably modified while still retaining many of the important advantages of the system. For example, while the driving unit 42 has many advantages, it may be advisable under some circumstances to change or simplify the construction. Thus, the specific friction drive for the turntable 30 may be changed, for example, to provide a rigidly mounted motor drive unit. Under some circumstances the turntable may be driven by a V-belt or a round belt of rubber or leather or by an endless coil spring. With such a driving arrangement the periphery of the turntable would be suitably grooved to receive the belt and the driving roller 69 would be similarly grooved and would be spaced a fixed distance from the turntable. An idler pulley would then be swingably mounted and resiliently urged against the belt to maintain the desired tension.

As many possible embodiments may be made of the mechanical features of the above invention and as the art herein described might be varied in various parts, all without departing from the scope of the invention, it is to be understood that all matter hereinabove set forth, or shown in the accompanying drawings is to be interpreted as illustrative and not in a limiting sense.

We claim:

1. In a telephone answering device, the combination of, a disk presenting a magnetic recording surface, a frame providing a mounting for said disk, a motor driving said disk a cyclic controller including a plurality of discs and a plurality of switches operated thereby, a sound arm assembly which is moved across the recording zone of said recording surface by rotation of said disk assembly, an amplifier means which is adapted to amplify sound being recorded upon or transcribed from said recording surface, a microphone receiver which is adapted to receive sound to be recorded and to transmit transcribed sound, manual switch means to selectively condition the apparatus for recording messages or for transcribing the recorded message, switch means which is connected to the circuit of said amplifier means and is adapted to connect the instrument to a telephone line circuit, relay means responsive to a ringing signal in the telephone line circuit, said cycle controller including interlock means to operate said motor for the completion of a cycle of operations after said motor has been operated for a predetermined period of time at the beginning of the cycle, said relay means being connected to operate said motor for the duration of each ringing signal whereby one or more ringing signals closes said interlock means and causes the cycle of operations to be carried to completion.

2. In a telephone answering device, the combination of, a disk presenting a magnetic recording surface, a frame providing a mounting for said disk, a motor driving said disk a cyclic controller including a plurality of discs and a plurality of switches operated thereby, a sound arm assembly which is moved across the recording zone of said recording surface by rotation of said disk assembly, an amplifier means which is adapted to amplify sound being recorded upon or transcribed from said recording surface, a microphone receiver which is adapted to receive sound to be recorded and to transmit transcribed sound, manual switch means to selectively condition the apparatus for recording messages or for transcribing the recorded message, indicating means which is connected to the other elements and is energized to indicate that the device is carried on a cycle of operations, and erasing means to erase all recordings from said recording surface, and wherein said cyclic controller includes means to energize said indicating means and said amplifier means for the portion of each cycle of operations wherein said sound arm assembly is moving across said recording zone, and which also includes means to set up a circuit to energize said erasing means at the beginning of each cycle of operations when said manual switch means is positioned to condition the apparatus for recording messages.

3. In a telephone answering device, the combination of, a disk presenting a magnetic recording surface, a frame providing a mounting for said disk, a motor driving said disk, a cyclic controller including a cam disk assembly driven by said disk and including a spiral disk surface and a plurality of switch control disks rigidly mounted to rotate about an axis, an arm assembly which is moved across the recording zone of said recording surface by rotation of said disk assembly, said sound arm assembly including a cam following arm resting upon said spiral surface disk and a spring urging said arm thereagainst, a speed reduction drive assembly providing the driving relationship between said motor and the first-mentioned disk, and positive driving means providing the driving connection between said first-mentioned disk and said cam disk assembly.

4. In a telephone answering device, the combination of, a disk presenting a magnetic recording surface, a frame providing a mounting for said disk, a motor driving said disk, a cyclic controller including a cam disk assembly driven by said disk, a sound arm assembly which is moved across the recording zone of said recording surface by rotation of said disk assembly, means pivotally mounting said motor about an axis substantially parallel with the axis of the first-mentioned disk, a speed reduction driving assembly which is driven by said motor and is mounted therewith and which includes a driving roller frictionally engaging the periphery of said first-mentioned disk to impart rotary movement thereto, and spring means urging said motor and said driving roller into said driving relationship.

5. Apparatus as described in claim 4 wherein said speed reduction driving assembly includes an intermediate roller which is driven from the shaft of the motor, and means mounting said intermediate roller comprising a sliding plate upon which said roller is pivoted, spring means urging said plate toward a position wherein said intermediate roller is held in its driving relationship, and a fixed plate providing a mounting for said sliding plate and providing for limited movement thereof.

6. In a telephone answering device of the character described, the combination of, a recording disk presenting a magnetic recording surface, a frame providing a mounting for said recording disk, a sound arm assembly including a sound head adapted to move across the recording zone of said recording surface, an erasing unit to remove prior recorded sound, and a cyclic controller to carry on a cycle of recording operations and including means to initially energize said erasing unit and to energize the circuit of said sound head during the time that said sound head is moving through said recording zone.

7. Apparatus as described in claim 6 wherein said cyclic controller includes means to permit the starting of the recording operation substantially at the time that the portion of the recording disk from which prior recorded sound has been erased reaches said sound head and prior to the termination of the erasing operation by said erasing device.

8. Apparatus as described in claim 7 wherein said frame includes a horizontal plate supported by a plurality of vertical legs, and a supporting base and casing construction enclosing the previously-mentioned parts, and an amplifying and switch assembly positioned within said casing construction.

9. In a telephone answering device, the combination of, a disk presenting a magnetic recording surface, a frame providing a mounting for said disk, a motor driving said disk, a cyclic controller including a cam disk assembly driven by said disk, a sound arm assembly which is moved across the recording zone of said recording surface by rotation of said disk assembly, amplifier means which is adapted to amplify sound being recorded upon or transcribed from said recording surface, switch means which is adapted to connect the instrument to a telephone line circuit, relay means responsive to ringing signals in the telephone line circuit, said cyclic controller including interlock means to operate said motor for the completion of a cycle of operations after said motor has been operated for a predetermined period of time at the beginning of the cycle, said relay means being connected to operate said motor for the duration of each ringing signal whereby one or more ringing signals closes said interlock means and causes the cycle of operations to be carried to completion, said cyclic controller including a switch to operate said amplifier means, and a pair of double-throw switches to connect said telephone line circuit alternatively to said ringing signal relay or to said amplifier means.

10. A device as described in claim 9 wherein said amplifier means has a plate slide circuit, and wherein said relay switch has a winding connected in series with said plate supply circuit, and acting as a choke coil.

11. A device as described in claim 10 which includes a power line transformer and rectifier means connected to supply power to said amplifier means, and wherein said amplifier means is connected between said transformer and said rectifier means.

12. Apparatus as described in claim 10 which includes, indicating means which is energized to indicate that the device is carrying on a cycle of operations, erasing means to erase all recordings from said recording surface, and manual switch means to selectively condition the apparatus for recording messages or for transcribing the recorded message, and wherein said cyclic controller includes means which operates during each cycle of operations wherein said sound arm assembly is moved across said recording zone, and wherein said cyclic controller also includes means to set up a circuit to energize said erasing means at the beginning of each cycle of operations and rendered effective by the positioning of said manual switch means to condition the apparatus for recording messages.

13. Apparatus as described in claim 10 which includes, a power line transformer, manual switch means to selectively condition the apparatus for recording messages or for transcribing the recorded messages, and erasing means to erase all recordings from said recording surface, said erasing means extending over the entire recording zone of said recording surface, and wherein said cyclic controller includes a switch to connect said erasing means to a secondary winding of said power line transformer at the beginning of each cycle of operations when said manual switch means is positioned to condition the apparatus for recording messages and to disconnect said erasing means when said magnetic recording disk has completed one revolution during which the flow of the plate supply current in said amplifier means is started, whereby said cyclic controller closes said switch to operate said erasing means before said switch to operate said amplifier means is closed.

References Cited in the file of this patent

UNITED STATES PATENTS

| | | |
|---|---|---|
| 2,005,788 | Keiser | June 25, 1935 |
| 2,093,675 | Henderson | Sept. 21, 1937 |
| 2,350,083 | Walker | May 30, 1944 |
| 2,374,842 | Shively et al. | May 1, 1945 |
| 2,376,272 | Peferson et al. | May 15, 1945 |
| 2,526,358 | Howell | Oct. 17, 1950 |
| 2,532,803 | Faus | Dec. 5, 1950 |
| 2,539,139 | Jordanoff et al. | Jan. 23, 1951 |
| 2,549,548 | Von Zimmermann | Apr. 17, 1951 |
| 2,567,092 | Williams | Sept. 4, 1951 |